Sept. 16, 1969    KANRYO SHIMIZU ET AL    3,467,902
STEP MOTOR DRIVE CONTROL CIRCUIT Filed Aug. 3, 1966                          3 Sheets-Sheet 1

STEP MOTOR 77

United States Patent Office 3,467,902
Patented Sept. 16, 1969

3,467,902
STEP MOTOR DRIVE CONTROL CIRCUIT
Kanryo Shimizu, Tokyo, and Norito Yoshitake and Kengo Kobayashi, Kawasaki-shi, Japan, assignors to Fujitsu Limited, Kawasaki, Japan, a Japanese corporation
Filed Aug. 3, 1966, Ser. No. 570,031
Claims priority, application Japan, Aug. 6, 1965, 40/47,769
Int. Cl. H02k 29/04; H02p 7/36
U.S. Cl. 318—138                     5 Claims

ABSTRACT OF THE DISCLOSURE

A step motor drive control circuit for a step motor having $n$ windings and $n$ phases includes $n$ flip flops each of which comprises a two-input flip flop having a forward signal input, a reverse signal input, an outside set input, an inside set input, an outside reset input, an inside reset input, a set output and a reset output.

---

The present invention relates to a drive control circuit. More particularly, the invention relates to a drive control circuit for a step motor.

Known drive control circuits for a step motor utilize what is known as the half pitch drive system. For a three phase step motor, the half pitch drive system is utilized by alternate excitation of 2–1 phases, and for a five phase step motor, the half pitch drive system is utilized by alternate excitation of 3–2 phases. The half phase drive system is complicated and the drive control circuits for such system are also complicated. The known five phase step motor drive control circuit, which utilizes NOR circuits, comprises 52 transistors.

The principal object of the present invention is to provide a new and improved step motor drive control circuit. The step motor drive control circuit of the present invention is of simple structure, compart structure and operates with efficiency, effectiveness and reliability. The step motor drive control circuit of the present invention comprises 10 transistors when it is utilized to control a five phase step motor.

In accordance with the present invention, a step motor drive control circuit is provided for a step motor having $n$ windings and $n$ phase, where $n$ is a whole number. The step motor drive control circuit comprises $n$ flip flops each having two stable conditions and each having forward signal input means, reverse signal input means, set input means, reset input means, set output means and reset output means. A forward input supplies a forward input signal to the forward signal input means of each of the flip flops. A reverse input supplies a reverse input signal to the reverse signal input means of each of the flip flops. A circuit connects the flip flops to each other in sequential cyclic relationship with the set output means of each of the flip flops connected to the reset input means of the next succeeding one of the flip flops and with the reset output means of each of the flip flops connected to the set input means of the next succeeding one of the flip flops. The circuit thus connects the flip flops in a manner whereby when a forward input signal is supplied to the forward signal input means of the flip flops each of the flip flops is switched to a condition opposite to the condition of the next preceding flip flop just prior to the supply of the forward input signal. Outputs couple a selected one of the output means of each of the flip flops and the corresponding windings of the step motor.

In order that the present invention may be readily carried into effect, it will now be described with reference to the accompanying drawings, wherein.

Figure 1:
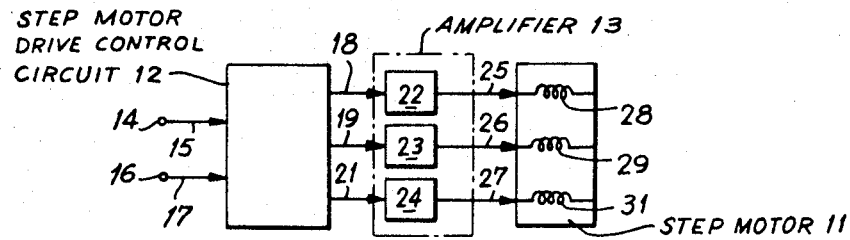
FIG. 1 is a block diagram of an embodiment of a step motor drive control circuit of the present invention for a three phase step motor.

In FIG. 1, a three-phase step motor 11 is controlled by the step motor drive control circuit 12 of the present invention via an amplifier 13. A forward signal is supplied to the step motor drive control circuit 12 via a forward input terminal 14 and a lead 15. The forward signal is for the movement of the motor 11 one step in its forward direction. A reverse signal is supplied to the step motor drive control circuit 12 via a reverse input terminal 16 and a lead 17.

The step motor drive control circuit 12 produces motor control signals in output leads 18, 19 and 21. The motor control signals are binary signals "0" or "1" and are amplified by the power amplifier 13. The power amplifier 13 comprises three amplification stages; the first stage 22 amplifies the signal in the lead 18, the second stage 23 amplifies the signal in the lead 19 and the third stage 24 amplifies the signal in the lead 21.

The amplifier 13 is connected to the step motor 11 via leads 25, 26 and 27 from the amplification stages 22, 23 and 24, respectively. The step motor 11, being a three phase motor, has three windings. A first motor winding 28 is connected to and energized via the lead 25, a second motor winding 29 is connected to and energized via the lead 26 and a third motor winding 31 is connected to and energized via the lead 27.

When there is a "1" motor control signal in one or more of the output leads 18, 19 and 21, such signal is amplified by the amplifier 13 and energizes the corresponding winding or windings of the motor 11. When there is a "0" motor control signal in one or more of the output leads 18, 19 and 21, the corresponding winding or windings of the motor 11 are not energized. Thus, the motor control signals in the output leads 18, 19 and 21 of the step motor drive control circuit 12 determine the energization condition of the three phase windings 28, 29 and 31 of the motor 11.

Table I illustrates a system for alternately energizing or exciting 2–1 phases of a three phase step motor.

TABLE I

| State of motor | Output lead signal | | | Direction of rotation |
|---|---|---|---|---|
|  | 21 | 19 | 18 |  |
| 1 | 1 | 1 | 0 | Forward ↑ |
| 2 | 1 | 0 | 0 |  |
| 3 | 1 | 0 | 1 |  |
| 4 | 0 | 0 | 1 |  |
| 5 | 0 | 1 | 1 |  |
| 6 | 0 | 1 | 0 | ↓ Reverse |

As shown in Table I, the output leads 18, 19 and 21 may be in one of six different states, 1, 2, 3, 4, 5, 6. Each time a forward signal is supplied to the forward input terminal 14, the state changes step by step in a forward sequence. Thus, if a succession of forward signals is supplied, the state changes, for instance, from 1 to 2, and then to 3, and then to 4, and then to 5, and then to 6, and then to 1, and so on. Each time a reverse signal is supplied to the reverse input terminal 16, the state changes step by step in a reverse sequence. Thus, if a succession of reverse signals is supplied, the state changes for instance from 1 to 6 and then to 5 and then to 4, and then to 3, and then to 2, and then to 1 and so on.

Figure 2:
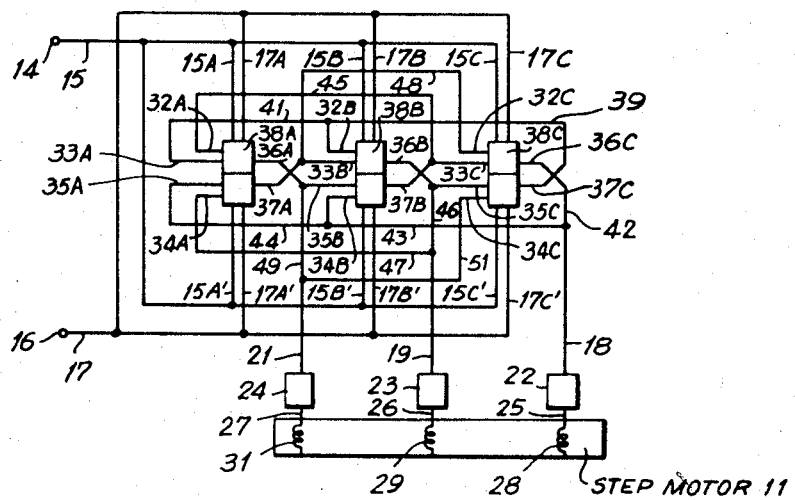
FIG. 2 is a circuit diagram of an embodiment of the step motor drive control circuit of the present invention.

FIG. 2 is an embodiment of the step motor drive control circuit of the present invention for a three phase motor. The step motor drive control circuit of FIG. 2 provides the energization control signals in the output leads 18, 19 and 21 in accordance with the system for alternate energization of 2–1 phases, as illustrated in Table I. The step motor drive control circuit of FIG. 2 comprises three two-input flip flops or bistable multivibrators. A two-input flip flop utilized in FIG. 2 is shown in a block diagram in FIG. 3 and in a circuit diagram in FIG. 4.

Figure 3:
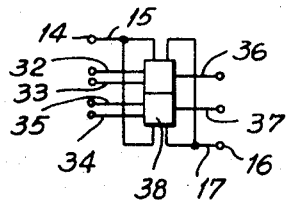
FIG. 3 is a block diagram of a two-input flip flop utilized in the circuit of FIG. 2.
Figure 4:
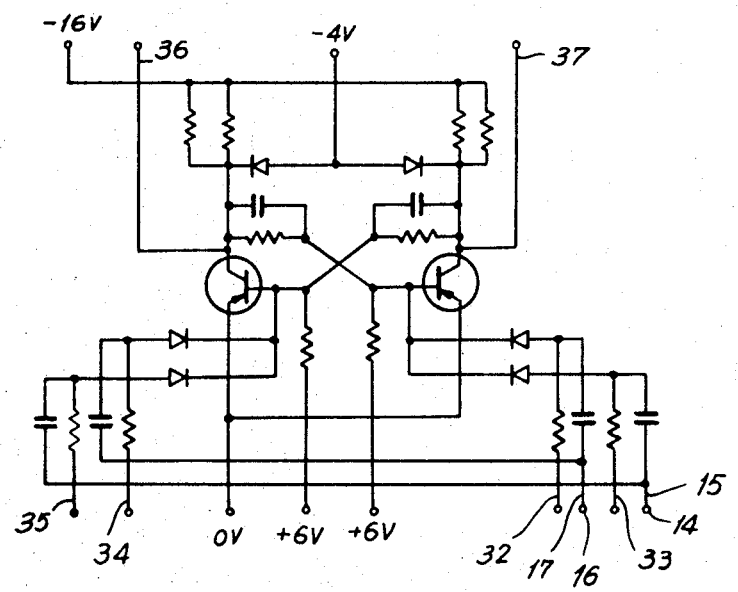
FIG. 4 is a circuit diagram of an embodiment of the two-input flip flop of FIG. 3.

In FIG. 3, a forward signal is supplied to the forward input terminal 14 and a reverse signal is supplied to the reverse input terminal 16. The two-input flip flop of FIGS. 3 and 4 has two set inputs 32 and 33, two reset inputs 34 and 35, a set output 36 and a reset output 37. The first set input 32 is the outside set input, the second set input 33 is the inside set input, the first reset input 34 is the outside reset input and the second reset input 35 is the inside reset input.

When a forward signal is supplied to the forward input terminal 14, the condition of the set and reset outputs 36 and 37 becomes the same as the condition of the inside set input 33 and the inside reset input 35. When a reverse signal is supplied to the reverse input terminal 16, the condition of the set and reset outputs 36 and 37 becomes the same as the condition of the outside set input 32 and the outside reset input 34.

In FIG. 2, the forward input terminal 14 is connected to the forward input of each of the three two-input flip flops 38A, 38B and 38C via the lead 15 and leads 15A, 15B and 15C, respectively, and leads 15A', 15B' and 15C', respectively. The reverse input terminal 16 is connected to the reverse input of each of the flip flops 38A, 38B and 38C via the lead 17 and leads 17A, 17B and 17C, respectively, and leads 17A', 17B' and 17C', respectively.

The reset output 37C of the flip flop 38C is connected to the outside set input 32B of the flip flop 38B via a lead 39 and to the inside set input 33A of the flip flop 38A via the lead 39 and a lead 41. The set output 36C of the flip flop 38C is connected to the outside reset input 34B of the flip flop 38B via leads 42 and 43 and to the inside reset input 35A of the flip flop 38A via the leads 42 and 43 and a lead 44. The set output 36C of the flip flop 38C is also connected to the output lead 18 via the lead 42.

The reset output 37B of the flip flop 38B is connected to the inside set input 33C of the flip flop 38C and to the outside set input 32A of the flip flop 38A via a lead 45. The set output 36B of the flip flop 38B is connected to the inside reset input 35C of the flip flop 38C and to the outside reset input 34A of the flip flop 38A via leads 46 and 47. The set output 36B of the flip flop 38B is also connected to the output lead 19 via the lead 46.

The reset output 37A of the flip flop 38A is connected to the inside set input 33B of the flip flop 38B and to the outside set input 32C of the flip flop 38C via a lead 48. The set output 36A of the flip flop 38A is connected to the inside reset input 35B of the flip flop 38B and to the outside reset input 34C of the flip flop 38C via leads 49 and 51. The set output 36A of the flip flop 38A is also connected to the output lead 21 via the lead 49.

In operation, each time a forward signal is supplied to the forward input terminal 14, each of the flip flops 38A, 38B and 38C is switched to the condition opposite the condition of the next preceding flip flop 38C, 38A and 38B, respectively. Thus, if, as indicated in Table I, in state 1 of the step motor 11, the flip flops 38A, 38B and 38C are in their 1, 1 and 0 condition, respectively, the output leads 21, 19 and 18 conduct the signals 1, 1 and 0, respectively.

When a forward signal is supplied to the forward input terminal 14, the flip flops 38A, 38B and 38C, as indicated in Table I, in state 2 of the step motor 11, are switched to their 1, 0 and 0 condition, respectively, because the previous condition of the next preceding flip flop 38C to the flip flop 38A was 0 and its opposite condition is 1, so the flip flop 38A in state 2 is 1. Similarly, the previous condition of the next preceding flip flop 38A to the flip flop 38B was 1 and is opposite condition is 0, so that flip flop 38B in state 2 is 0, and the previous condition of the next preceding flip flop 38B to the flip flop 38C was 1 and is opposite condition is 0, so the flip flop 38C in state 2 is 0.

When the next forward signal is supplied to the forward input terminal 14, the flip flops 38A, 38B and 38C, as indicated in Table I, in state 3 of the step motor 11, are switched to their 1, 0 and 1 condition, respectively. As each forward signal is supplied to the forward input terminal 14, the flip flops 38A, 38B and 38C are switched to their 0, 0 and 1 condition in state 4, to their 0, 1 and 1 condition in state 5, to their 0, 1 and 0 condition in state 6 and to their 1, 1 and 0 condition in state 1.

Each time a reverse signal is supplied to the reverse input terminal 16, each of the flip flops 38A, 38B and 38C is switched to the condition opposite the condition of the next succeeding flip flop 38B, 38C and 38A, respectively. Thus, as shown in Table I, each time a reverse signal is supplied to the reverse input terminal 16, the flip flops are switched from the state 6 of the step motor 11, to the state 5, to the state 4, to the state 3, to the state 2, to the state 1 and to the state 6. In switching from state 4 to state 3, for example, the flip flops 38A, 38B and 38C change their 0, 0 and 1 condition to a 1, 0 and 1 condition, since the flip flop 38A, which is initially 0, changes to the opposite of the 0 initial condition of the flip flop 38B which is 1, the flip flop 38B, which is initially 0, changes to the opposite of the 1 initial condition of the flip flop 38C which is 0, and the flip flop 38C, which is initially 1, changes to the opposite of the 0 initial condition of the flip flop 38A which is 1.

Table II illustrates a system for alternately energizing or exciting 3–2 phases of a five phase step motor.

TABLE II

| State of motor | Output lead signal | | | | | Direction of rotation |
|---|---|---|---|---|---|---|
| | 61 | 64 | 62 | 65 | 63 | |
| 1 | 1 | 1 | 1 | 0 | 0 | Forward ↑ |
| 2 | 1 | 1 | 0 | 0 | 0 | |
| 3 | 1 | 1 | 0 | 0 | 1 | |
| 4 | 1 | 0 | 0 | 0 | 1 | |
| 5 | 1 | 0 | 0 | 1 | 1 | |
| 6 | 0 | 0 | 0 | 1 | 1 | |
| 7 | 0 | 0 | 1 | 1 | 1 | |
| 8 | 0 | 0 | 1 | 1 | 0 | |
| 9 | 0 | 1 | 1 | 1 | 0 | |
| 10 | 0 | 1 | 1 | 0 | 0 | ↓ Reverse |

As shown in Table II, the output leads 61, 62, 63, 64 and 65 of the drive control circuit (FIG. 5) of the present invention for a five phase step motor may be in one of ten different states 1, 2, 3, 4, 5, 6, 7, 8, 9, 10. Each time a forward signal is supplied to a forward input terminal 66 (FIG. 5), the state changes step by step in a forward sequence. Thus, if a succession of forward signals is supplied, the state changes for instance from 1 to 2, and then to 3, and then to 4, and then to 5, and so on. Each time a reverse signal is supplied to the reverse signal is supplied to the reverse input terminal 67, the state changes in a reverse sequence. Thus, if a succession of reverse signals is supplied, the state changes for instance from 1 to 10 and then to 9 and then to 8 and then to 7, and so on.

Figure 5:
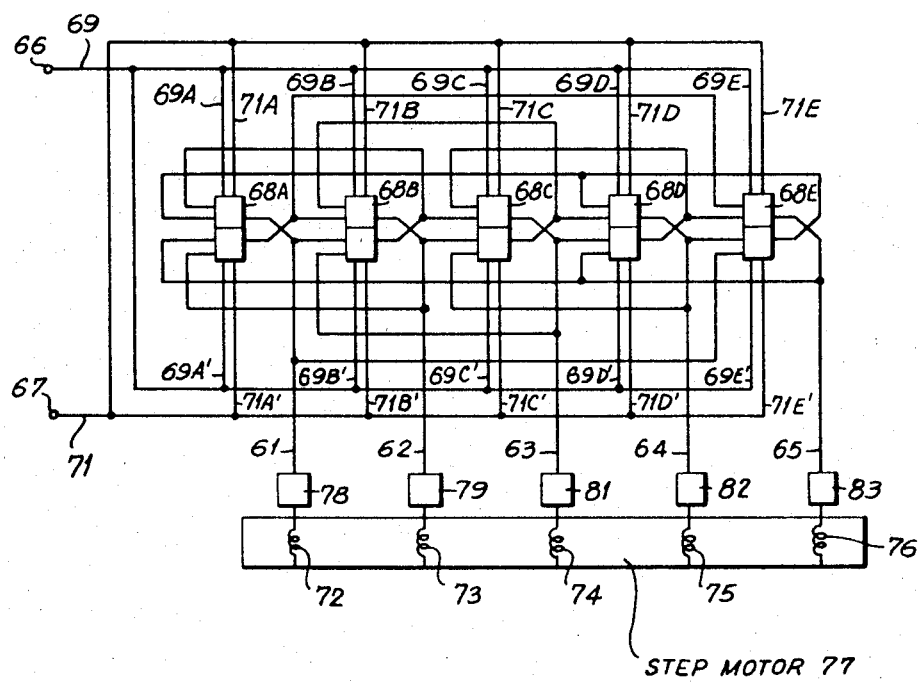
FIG. 5 is a circuit diagram of another embodiment of the step motor drive control circuit of the present invention.

FIG. 5 is another embodiment of the step motor drive control circuit of the present invention for a five-phase motor. The step motor drive control circuit of FIG. 5 provides the energization control signals in the output leads 61, 62, 63, 64, and 65 in accordance with the system for alternate energization of 3–2 phases, as illustrated in Table II. The step motor drive control circuit of FIG. 5 is similar to the drive control circuit of FIG. 2, except that it utilizes five two-input flip flops of the type of FIGS. 3 and 4, rather than three as utilized in FIG. 2.

In FIG. 5, the forward input terminal 66 is connected to the forward input of each of the five two-input flip flops 68A, 68B, 68C, 68D and 68E via a lead 69 and leads 69A, 69B, 69C, 69D and 69E, respectively, and leads 69A', 69B', 69C', 69D' and 69E', respectively. The reverse input terminal 67 is connected to the reverse input of each of the flip flops 68A, 68B, 68C, 68D and 68E via a lead 71 and leads 71A, 71B, 71C, 71D and 71E, respectively, and leads 71A', 71B', 71C', 71D' and 71E', respectively.

The flip flops 68A, 68B, 68C, 68D and 68E are connected to each other in the same manner as the flip flops 38A, 38B and 38C of FIG. 2 are connected to each other, as described. The operation of the circuit of FIG. 5 is the same as the operation of the circuit of FIG. 2. Thus, as shown in Table II, each time a forward signal is supplied to the forward input terminal 66, each of the flip flops 68A, 68B, 68C, 68D and 69E is switched to the condition opposite the condition of the next preceding flip flop 68E, 68A, 68B, 68C and 68D, respectively.

The signals in the output leads 61, 62, 63, 64 and 65 are supplied to coils 72, 73, 74, 75 and 76, respectively, a five phase step motor 77 via amplifier stages 78, 79, 81, 82 and 83, respectively, in the manner of the drive control circuit of FIG. 2. As each forward signal is supplied to the forward input terminal 66, the flip flops 68A, 68D, 68B, 68E and 68C are switched from their 1, 1, 1, 0 and 0 condition in state 1 to their 1, 1, 0, 0 and 0 condition in state 2, to their 1, 1, 0, 0 and 1 condition in state 3, to their 1, 0, 0, 0, and 1 condition in state 4, to their 1, 0, 0, 1 and 1 condition in state 5, to their 0, 0, 0, 1 and 1 condition in state 6, to their 0, 0, 1, 1 and 1 condition in state 7, to their 0, 0, 1, 1 and 0 condition in state 8, to their 0, 1, 1, 1 and 0 condition in state 9, to their 0, 1, 1, 0 and 0 condition in state 10, and to their 1, 1, 1, 0 and 0 condition in state 1.

Each time a reverse signal is supplied to the reverse input terminal 67, each of the flip flops 68A, 68B, 68C, 68D and 68E is switched to the condition opposite the condition of the next succeeding flip flop 68B, 68C, 68D, 68E and 68A, respectively. Thus, as shown in Table II, each time a reverse signal is applied to the reverse input terminal 67, the flip flops are switched from the state 10 of the step motor 77, to the state 9, to the state 8, to the state 7, to the state 6, to the state 5, to the state 4, to the state 3, to the state 2, to the state 1 and to the state 10.

In switching from state 7 to the state 6, for example, the flip flops 68A, 68B, 68C, 68D and 68E, corresponding to the output leads 61, 62, 63, 64 and 65, respectively, change their 0, 1, 1, 0 and 1 condition to a 0, 0, 1, 0 and 1 condition, since the flip flop 68A, which is initially 0, changes to the opposite of the 1 initial condition of the flip flop 68B which is 0, the flip flop 68B, which is initially 1, changes to the opposite of the 1 initial condition of the flip flop 68C which is 0, the flip flop 68C, which is initially 1, changes to the opposite of the 0 initial condition of the flip flop 68D which is 1, the flip flop 68D, which is initially 0, changes to the opposite of the 1 initial condition of the flip flop 68E which is 0, and the flip flop 68E, which is initially 1, changes to the opposite of the 0 initial condition of the flip flop 68A which is 1.

In each of FIGS. 2 and 5, if the step motor is to be driven in a single direction only, such as, for example, only forward, one-input flip flops may be utilized instead of two-input flip flops. A one-input flip flop has a single set input, a single reset input, a set output and a reset output.

While the invention has been described by means of specific examples and in specific embodiments, we do not wish to be limited thereto, for obvious modifications will occur to those skilled in the art without departing from the spirit and scope of the invention.

We claim:
1. A step motor drive control circuit for a step motor having $n$ windings and $n$ phases, where $n$ is a whole number, said step motor drive control circuit comprising
   $n$ flip flops each having two stable conditions and each comprising a two-input flip flop each having forward signal input means, reverse signal input means, an outside set input, an inside set input, an outside reset input, an inside reset input, a set output and a reset output;
   forward input means for supplying a forward input signal to the forward signal input means of each of said flip flops;
   reverse input means for supplying a reverse input signal to the reverse signal input means of each of said flip flops;
   circuit means connecting said flip flops to each other in sequential cyclic relationship with the set output means of each of said flip flops connected to the reset input means of the next succeeding one of said flip flops and with the reset output means of each of said flip flops connected to the set input means of the next succeeding one of said flip flops in a manner whereby when a forward input signal is supplied to the forward signal input means of said flip flops each of said flip flops is switched to a condition opposite to the condition of the next preceding flip flop just prior to the supply of the forward input signal; and
   output means coupling a selected one of the output means of each of said flip flops and the corresponding windings of said step motor.

2. A step motor drive control circuit as claimed in claim 1, wherein $n$ is an odd number.

3. A step motor drive control circuit as claimed in claim 1, wherein $n$ is three and said circuit means connects the set output means of each of said flip flops to the reset input means of each of the others of said flip flops and said circuit means connects the reset output means of each of said flip flops to the set input means of each of the others of said flip flops.

4. A step motor drive control circuit as claimed in claim 1, wherein said output means is connected to the set output means of each of said flip flops.

5. A step motor drive control circuit as claimed in claim 1, wherein said output means comprises a plurality of amplifier means and a plurality of leads, each of said leads connecting a corresponding one of the output means of said flip flops to a corresponding one of the windings of said step motor via a corresponding one of said amplifier means.

References Cited

UNITED STATES PATENTS

| | | | |
|---|---|---|---|
| 3,109,131 | 10/1963 | Byrd | 318—138 |
| 3,112,433 | 11/1963 | Fairbanks | 318—138 XR |
| 3,243,600 | 3/1966 | Fatz | 307—222 |
| 3,277,380 | 10/1966 | Paufve | 328—44 XR |
| 3,297,927 | 1/1967 | Blakeslee | 318—138 |
| 3,323,067 | 5/1967 | Eckl | 307—222 |
| 3,354,367 | 11/1967 | Stockebrand | 318—138 |

OTIS L. RADER, Primary Examiner

G. R. SIMMONS, Assistant Examiner

U.S. Cl. X.R.

307—222; 318—254